United States Patent [19]

Minaki et al.

[11] Patent Number: 5,107,336
[45] Date of Patent: Apr. 21, 1992

[54] IMAGE READING APPARATUS FOR DETERMINING A DISTANCE BETWEEN AN IMAGE OF A SUBJECT PHOTOGRAPHED BY A CAMERA AND THE CENTER OF AN IMAGE FIELD

[75] Inventors: Takashi Minaki; Yukinori Koizumi; Masashi Saito, all of Tokyo, Japan

[73] Assignee: Konica Corporation, Tokyo, Japan

[21] Appl. No.: 625,856

[22] Filed: Dec. 11, 1990

[30] Foreign Application Priority Data

Dec. 22, 1989 [JP] Japan ................................. 1-334075

[51] Int. Cl.⁵ .......................................... H04N 5/25
[52] U.S. Cl. ................................. 358/222; 358/209
[58] Field of Search ............... 358/125, 222, 224, 126, 358/108, 209

[56] References Cited

U.S. PATENT DOCUMENTS 4,891,696  1/1990  Miyazaki ........................... 358/98

*Primary Examiner*—Victor R. Kostak
*Attorney, Agent, or Firm*—Frishauf, Holtz, Goodman & Woodward

[57] ABSTRACT

An image reader for panning a camera view to a movable subject. The image reader has a CCD to scan an image in a horizontal direction and a vertical direction, and the CCD outputs image signals in a normal direction and a reversal direction. The image reader also has a circuit to determine a position of the movable suject according to the image signals in the normal direction and the reversal direction, and controls the camera view according to the position of the movable subject.

11 Claims, 5 Drawing Sheets

F I G. 2
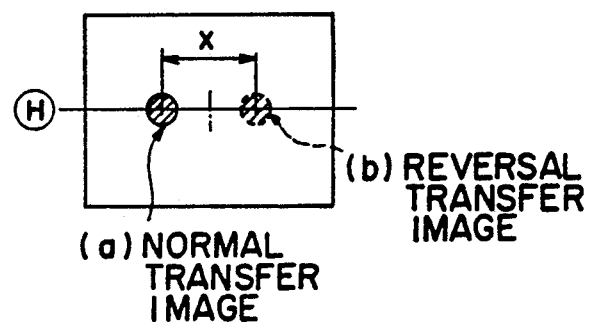
F I G. 3
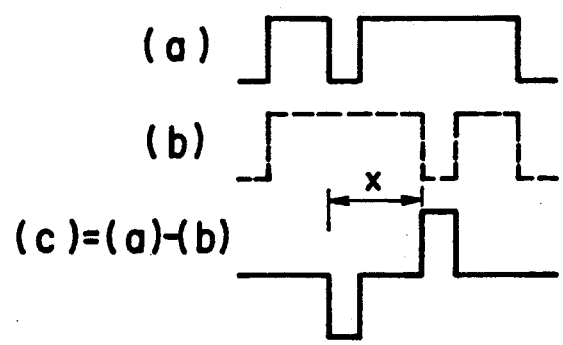

(b) REVERSAL TRANSFER IMAGE (a) NORMAL TRANSFER IMAGE (a)

(b)

(c)=(a)-(b)

(a)

(b)

(c)=(a)-(b)

F I G. 8 (a)
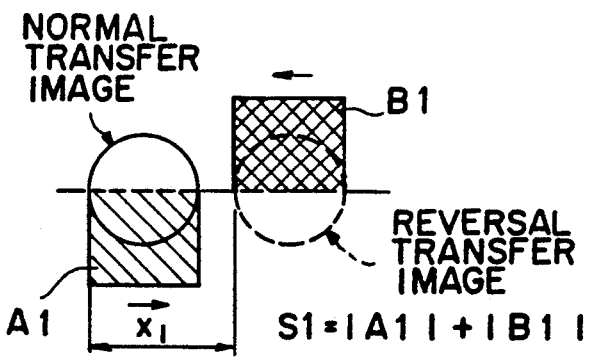
F I G. 8 (b)
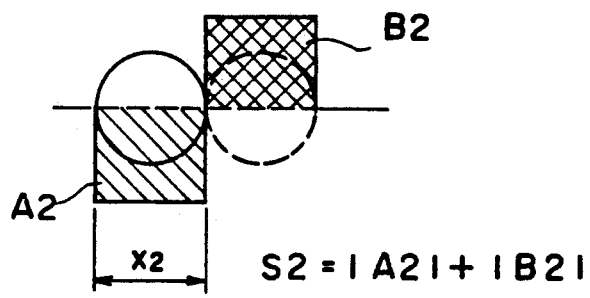
F I G. 8 (c)
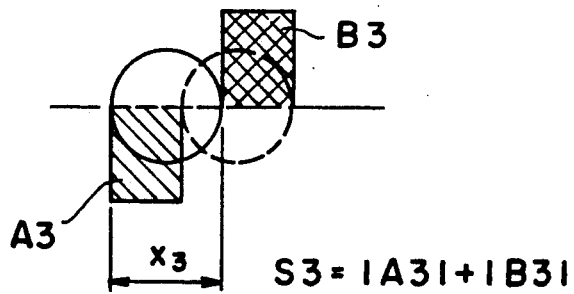
F I G. 8 (d)
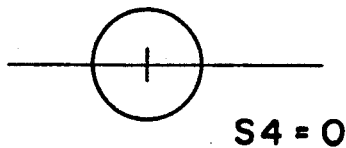

(a) NORMAL TRANSFER IMAGE
(b) REVERSAL TRANSFER IMAGE $S1 = |A1| + |B1|$
$S2 = 0$
$S3 = |A3| + |B3|$

IMAGE READING APPARATUS FOR DETERMINING A DISTANCE BETWEEN AN IMAGE OF A SUBJECT PHOTOGRAPHED BY A CAMERA AND THE CENTER OF AN IMAGE FIELD

BACKGROUND OF THE INVENTION

The present invention relates to an image reading apparatus capable of detecting the distance between a subject and the center of an image reading frame.

In the past, the following two methods have been known for photographing a subject by the use of a video camera and for panning the video camera for the purpose of bringing the subject to the center of an image field or for detecting the distance between the subject and the center of the image field.

(1) A method to detect a position of a subject by using a photocoupler composed of a photoreceptor and a light-emitter and to pan a video camera based upon said position.

(2) A method wherein a reference position (e.g. a matrix in a monitor screen or the like) within an image reading range of a video camera is inputted in advance and a position of a subject contained in image signals is detected electrically and the video camera is panned based on the detected position.

In the aforesaid method (1), an apparatus tends to be large in size because a special sensor for detecting a position is needed in addition to a video camera. Further, the method has its disadvantage that a parallax is caused between the video camera and the position detection sensor.

In the aforesaid method (2), it is impossible to detect position without an absolute reference position, and hereby impossible to calculate an amount of panning. Further, the method has its disadvantage that accuracy of detecting a position is dependent on accuracy of memory to be stored.

The invention has been devised for solving the aforesaid problems and its object is to provide an image reading apparatus wherein it is possible, without requiring any special sensor for detecting a position, to detect a position by utilizing image signals and to control an image reading range.

SUMMARY OF THE INVENTION

An image reading apparatus of the invention for solving aforesaid problems is characterized in that the apparatus is provided with a solid-state image reading element wherein both a horizontal transfer image and a vertical transfer image are capable of being switched either to a normal direction or to a reversal direction, a drive means for the solid-state image reading element wherein both horizontal transfer image direction and vertical transfer image direction are capable of being switched either to a normal direction or to a reversal direction alternately, an operation circuit that receives output signals from the solid-state image reading element driven by the drive means for the solid-state image reading element and thereby detects a position of a subject in an image field, and a control means for a photographing range that receives results of operation of the operation circuit and thereby controls the photographing range.

In an image reading apparatus of the invention, normal transfer image and reversal transfer image are made alternately in a horizontal direction with a certain interval with regard to the solid-state image reading element, thus output signals are generated. Owing to the outputs by means of normal image transfer and that by means of reversal image transfer, the deviation in position of a subject is detected. Then, the photographing range is controlled depending on the deviation in position thus detected.

BRIEF DESCRIPTION OF THE DRAWINGS

FIG. 2 is an illustration showing how photographing is made, FIG. 3 is a wave form showing signal wave forms in photographing shown in FIG. 2, FIG. 8 is an illustration showing minutely how positions are registered.

DETAILED DESCRIPTION OF THE INVENTION

Figure 1:
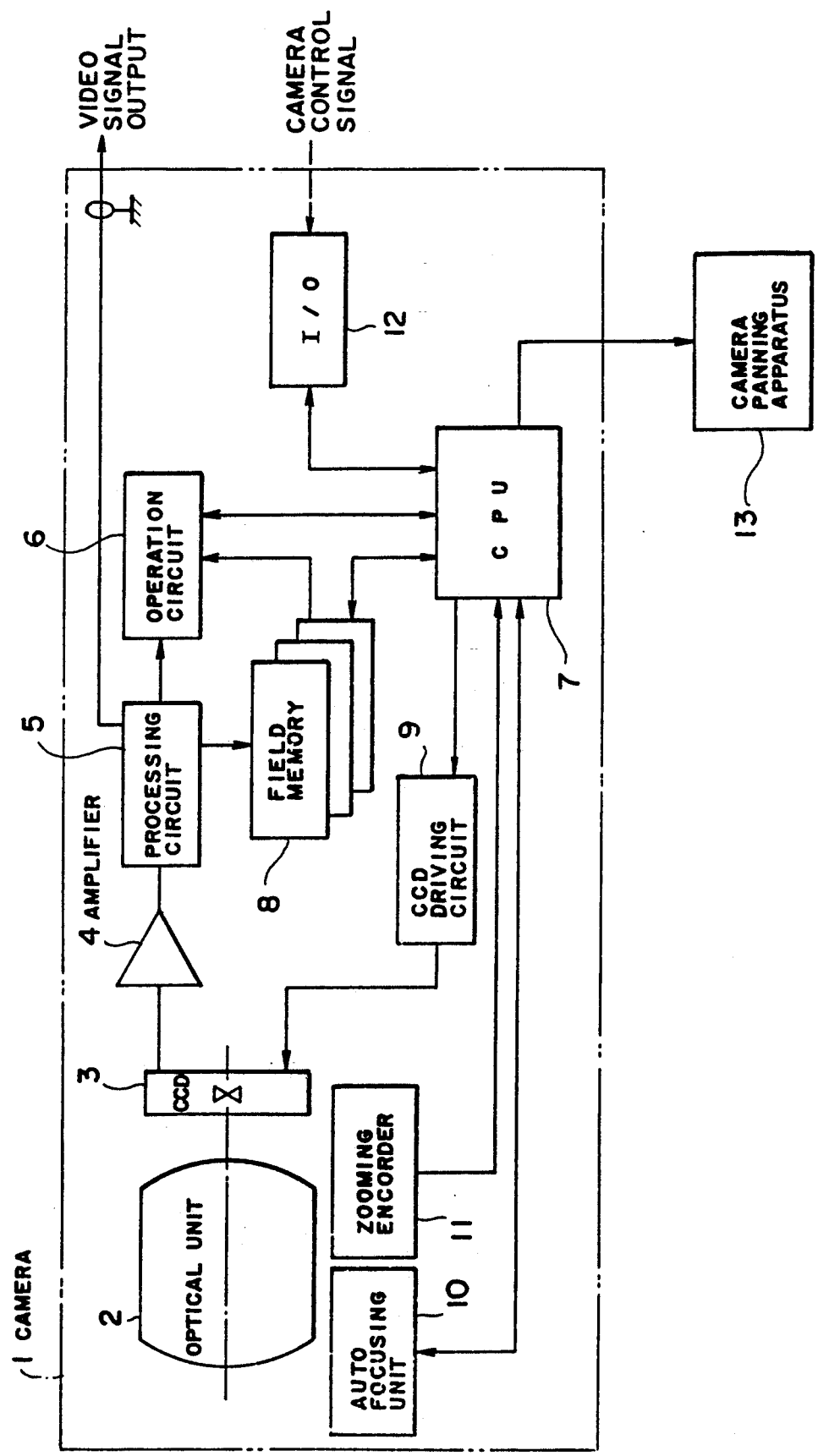
FIG. 1 is a block diagram showing the structure of an image reading apparatus that is an example of the invention.
Figure 4:
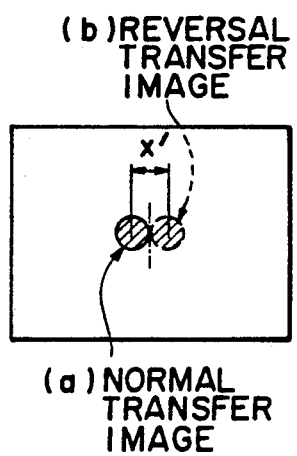
FIG. 4 is an illustration showing how photographing is made.
Figure 5:
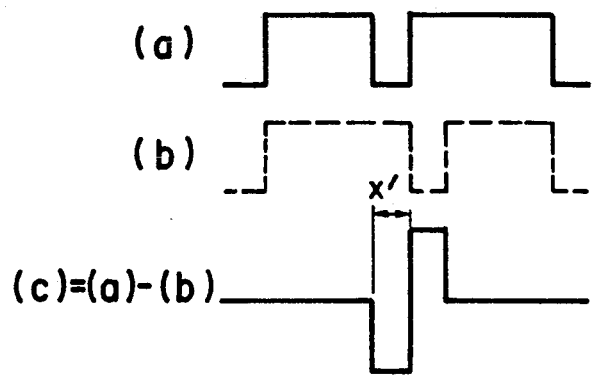
FIG. 5 is a wave form diagram showing signal wave forms in photographing shown in FIG. 4.
Figure 6:
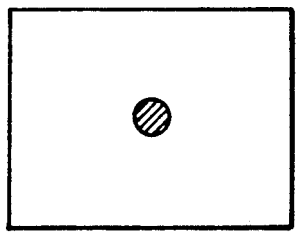
FIG. 6 is an illustration showing how photographing is made.
Figure 7:
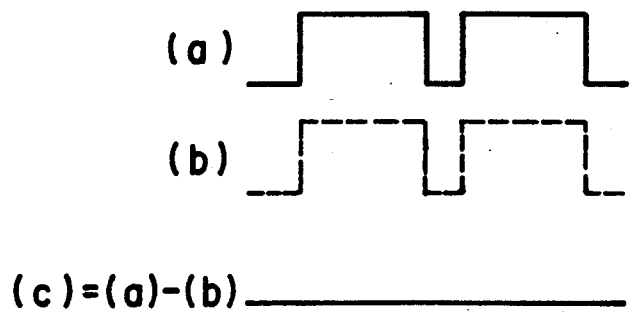
FIG. 7 is a wave form diagram showing signal wave forms in photographing shown in FIG. 6.

Referring to the drawings, examples of the invention will be explained as follows.

FIG. 1 is a block diagram showing the structure of an example of the invention. In the figure, the numeral 1 represents a camera that photographs a subject and generates the video signals of the subject, 2 is an optical unit that leads an image of the subject to a solid-state image reading element, 3 represents CCD forming the solid-state image reading element, 4 is an amplifier that amplifies an output of CCD 3, 5 is a processing circuit that converts output signals of CCD 3 amplified by amplifier 4 into image signals, 6 is an operation circuit that detects a position of a subject based on the position of signal wave forms of the subject contained in the image signals, 7 is a CPU that forms a photographing range control means generating data to be used for panning camera 1, 8 is a field memory in which image signals coming from processing circuit 5 are stored, 9 is a CCD driving circuit that forms an image reading element drive means which drives CCD 3 normally and reversely at a certain interval (e.g. every one field), 10 is an autofocusing (AF) unit that controls focusing of optical unit 2, 11 is a zooming encoder that detects the situation of zooming of optical unit 2, 12 is an I/O that inputs data from or outputs data to external equipment, and 13 is a camera panning apparatus that pans camera 1 based on the data obtained by CPU 7.

Operation of the apparatus shown in FIG. 1 will now be explained with reference to FIGS. 2–7.

When a subject is positioned slightly left of center of the image field as shown with a solid line in FIG. 2, an image output (hereinafter referred to as a normal transfer age) generated when a horizontal transfer CCD of CCD 3 is driven in a normal direction (hereinafter referred to simply as normal image transfer) becomes like a circle shown with a solid line in FIG. 2. In the next field, CCD driving circuit 9 reversely drives (hereinafter referred to as reversal image transfer) the horizontal transfer CCD of CCD 3. Therefore, the output of CCD 3 (hereinafter referred to as a reversal transfer image) becomes like a circle shown with a dotted line in FIG. 2. When a scanning line at about the center of an image field is observed carefully in such a case, signals having wave forms shown in FIGS. 3(a) and (b) corresponding respectively to a solid line and to a dotted line in FIG. 2 are obtained. Through the subtraction between these signal wave forms ((a)–(b)), operation circuit 6 obtains signals with wave forms shown in (c). In the wave form in (c), the distance 'x' between the negative pulse and the positive one is that between a transfer image (shown with a solid line in FIG. 2) and a reversal transfer image (shown with a dotted line in FIG. 2). Therefore, the distance by which the subject is deviated from the center of the image field is equivalent to x/2. Further, one can tell the direction of deviation of the subject by observing on which side the positive pulse is located and on which side the negative one is located. Operation circuit 6 obtains this information and provides it to CPU 7. Based on this information, CPU 7 drives camera panning apparatus 13 depending on the value of deviation. The camera panning apparatus mentioned here means the one wherein the directions of camera 1 or optical unit 2 and CCD 3 against the subject can be changed automatically or manually by the use of electromagnetic motors and gears. While camera panning apparatus 13 is driving, an image reading frame is like one shown in FIG. 4 and signal wave forms are like those shown in FIG. 5. After completion of panning, the image reading frame becomes the one shown in FIG. 6 and signal wave forms in such a case are like the ones shown in FIG. 7. In this case, signal wave forms (FIG. 7 (a)) in normal image transfer and signal wave forms (FIG. 7 (b)) in reversal image transfer coincide with each other. Therefore, the results of subtraction lead only to a direct current component (FIG. 7 (c)). Owing to this, CPU 7 detects that the position deviation has been eliminated, and stops driving camera panning apparatus 13.

Incidentally, though it is possible to process on a real time basis by leading image signals from processing circuit 5 to operation circuit 6, it is also possible to process after storing image signals from processing circuit 5 in field memory 8 for a while.

Figure 9:
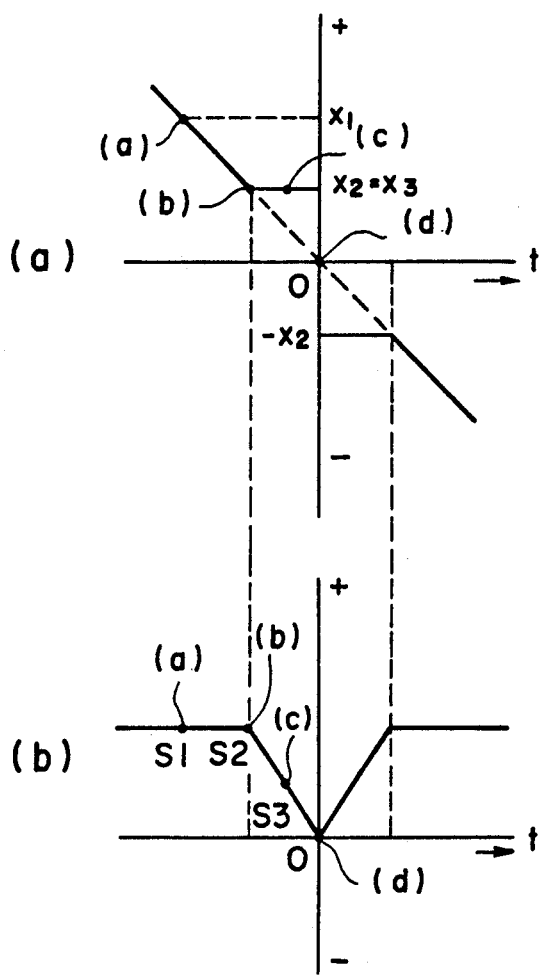
FIG. 9 is an illustration showing how position registering is operated.

Next, further detailed explanation will be made for a normal transfer image and a reversal transfer image. While camera 1 is being panned by camera panning apparatus 13, both the normal transfer image (a circle shown with a solid line) and the reversal transfer image (a circle shown with a dotted line) change gradually as shown in FIGS. 8 (a)–(d). On the assumption that $x(x_1-x_3)$ represents a phase deviation and $S(S_1-S_3)$ represents an integrated value both generated when subtraction between the normal transfer image and the reversal transfer image is performed, the changes of phase deviation x and integrated value S become those shown in FIG. 9. Namely, the change of phase deviation x is represented by FIG. 9 (a) and that of integrated value S is represented by FIG. 9 (b). Based on those shown in FIGS. (a) and (b), therefore, operation circuit 6 judges whether a subject comes to the center of an image reading frame (the situation of FIG. 8 (d)) or not.

Incidentally, though a horizontal direction only is discussed in aforesaid explanation, a combination of both horizontal and vertical directions in terms of transfer image makes it possible to detect and control positions on a two-dimensional basis represented by X - Y axes. Therefore, an image reading apparatus of the invention can be used even as an eye of a robot and an automatic panning function for a camera.

In the explanation mentioned above, position control is made by detecting a relative position deviation between a normal transfer image and a reversal transfer image. In addition to this, it is possible, utilizing zooming information, to calculate absolute amount of deviation from the center of an image field L based on phase deviation x. Namely, on the assumption that '1' represents a phase amount for total angle of field, 'x' represents a phase deviation and K represents a zooming coefficient, absolute amount of deviation L mm can be obtained by the equation of $L = K \times x/1$.

Figure 10:
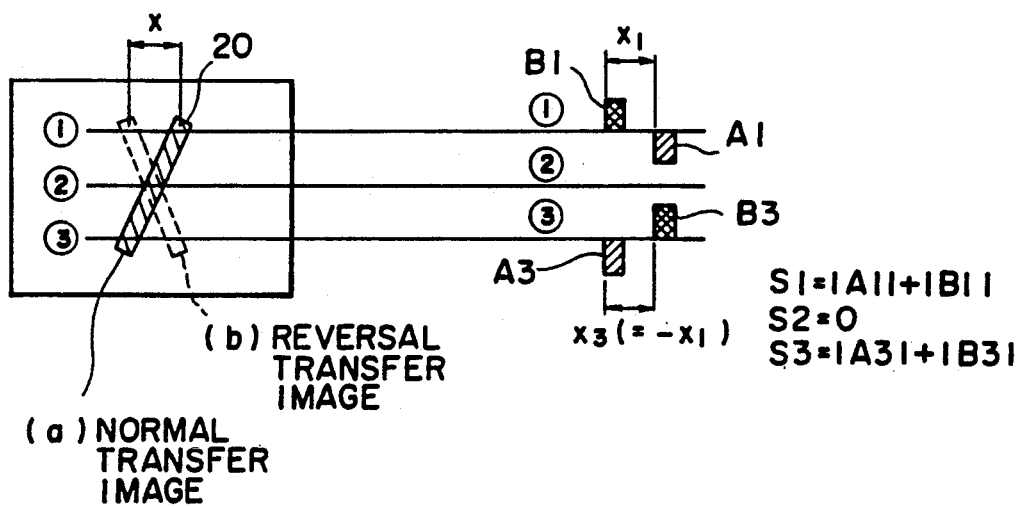
FIG. 10 is an illustration showing other application of the invention.

FIG. 10 is an illustration of an example of other application of the invention wherein an amount of inclination x of certain component 20 is detected. Namely, an amount of inclination $x = x_{max}$ to be detected is under the conditions of ...S = Min and ...x = 0. Absolute amount L' mm is represented by $L' = K \times x_{max}/2l$.

In the present example, as stated above, there is no need to provide a special position detection sensor, which makes a total apparatus to be small in size and thereby achieves cost reduction of the apparatus.

In addition to that, there is generated no parallax like the one caused when a position detection sensor is used because image signals are not used. Further, since it is possible to conduct operation without giving complex processing to image signals, the system can be small in scale and the reliability of the system is high. Moreover, accuracy of the system can be enhanced up to the limit of horizontal resolving power because image signals are processed as they are.

In addition to the above, it is not necessary to input or establish an absolute reference position because relative positions are detected, resulting in an operation and software which are not complex.

As stated above in detail, an image reading apparatus of the invention is provided with a solid-state image reading element wherein both a horizontal transfer image and a vertical transfer image are capable of being switched either to a normal direction or to a reversal direction, a drive means for the solid-state image reading element wherein both horizontal transfer image direction and vertical transfer image direction are capable of being switched either to a normal direction or to a reversal direction alternately, an operation circuit that receives output signals from the solid-state image reading element driven by the drive means for the solid-state image reading element and thereby detects a position of a subject in an image field, and a control means for a photographing range that receives results of operation of the operation circuit and thereby controls the photographing range. Therefore, normal transfer image and reversal transfer image are made alternately in a horizontal direction with a certain interval with regard to the solid-state image reading element, thus output signals are generated. Owing to the output by means of normal image transfer and that by means of reversal image transfer, the deviation in position of a subject is detected. Then, the photographing range is controlled depending on the deviation in position thus detected. As a result of this, it is possible to obtain an image reading apparatus wherein position detection and control of photographing range can be made by the use of image signals without requiring a special position detection sensor.

What is claimed is:

1. An apparatus for use with a camera to determine the position, in a two-dimensional image field, of a subject photographed by said camera in said image field, said apparatus comprising:

image reading means responsive to an output of said camera for providing data signals corresponding to said image field;

processing means for receiving said data signals to produce therefrom, for a selected line of said image field, image signals corresponding to one of said two dimensions and with said selected line including data signals corresponding to said subject, whereby said image signals are useable by an image display to generate an image of said image field;

means for controlling said processing means to produce a normal image signal corresponding to traversal of said selected line in a predetermined direction, and to produce a reverse image signal corresponding to traversal of said selected line in a direction opposite to said predetermined direction; and means for combining said normal image signal and said reverse image signal to determine a position of said subject in said image field.

2. The apparatus claimed in claim 1, wherein said image reading means reads an image in a horizontal direction and a vertical direction.

3. The apparatus of claim 1, wherein said combining means determines a position of said subject relative to the center of said image field along said selected line.

4. The apparatus of claim 3, wherein said combining means subtracts one of said normal and reverse image signals from the other to determine a distance between the subject in the normal image signal and the subject in the reverse image signal, and the spacing of said subject from the center of said image field is taken to be one half of said distance.

5. The apparatus of claim 4, wherein said combining means produces a subtraction result signal having opposite polarity portions, with the direction of said subject from the center of said image field being indicated by which polarity portion is first in said subtraction result signal.

6. The apparatus of claim 5, wherein said image reading means includes a photoelectric device including means for storing said data signals corresponding to images in said image field photographed by said camera, and said processing means includes means for retrieving said stored data signal corresponding to any one of the plurality of lines of said two-dimensional image field.

7. The apparatus of claim 6, wherein said photoelectric device is a CCD, and said retrieving means is a CCD driving circuit.

8. The apparatus of claim 7, further comprising means for panning said camera so as to eliminate said spacing between the subject and the center of said image field.

9. The apparatus of claim 1, wherein said image reading means includes a photoelectric device including means for storing said data signals corresponding to images in said image field photographed by said camera, and said processing means includes means for retrieving said stored data signals corresponding to any one of a plurality of lines of said two-dimensional image field.

10. The apparatus of claim 9, wherein said photoelectric device is a CCD, and said retrieving means is a CCD driving circuit.

11. The apparatus of claim 1, further comprising means for panning said camera so as to eliminate said spacing between the subject and the center of said image field.

* * * * *